(No Model.)

J. B. CAMPBELL.
CAR COUPLING.

No. 541,962. Patented July 2, 1895.

Witnesses:
M. E. Harrison
Ralph Daut

Inventor.
James B Campbell
Per. O. D. Levis

UNITED STATES PATENT OFFICE.

JAMES B. CAMPBELL, OF PITTSBURG, PENNSYLVANIA.

CAR-COUPLING.

SPECIFICATION forming part of Letters Patent No. 541,962, dated July 2, 1895.

Application filed April 18, 1895. Serial No. 546,221. (No model.)

*To all whom it may concern:*

Be it known that I, JAMES B. CAMPBELL, a citizen of the United States, residing at Pittsburg, in the county of Allegheny and State of Pennsylvania, have invented certain new and useful Improvements in Street-Railway Car-Couplers; and I do hereby declare the following to be a full, clear, and exact description of the invention, such as will enable others skilled in the art to which it pertains to make and use the same, reference being had to the accompanying drawings, which form a part of this specification.

My invention relates to an improved street railway car coupler, and it consists in certain details of construction and combination of parts as will be fully described hereinafter.

Figure 1:
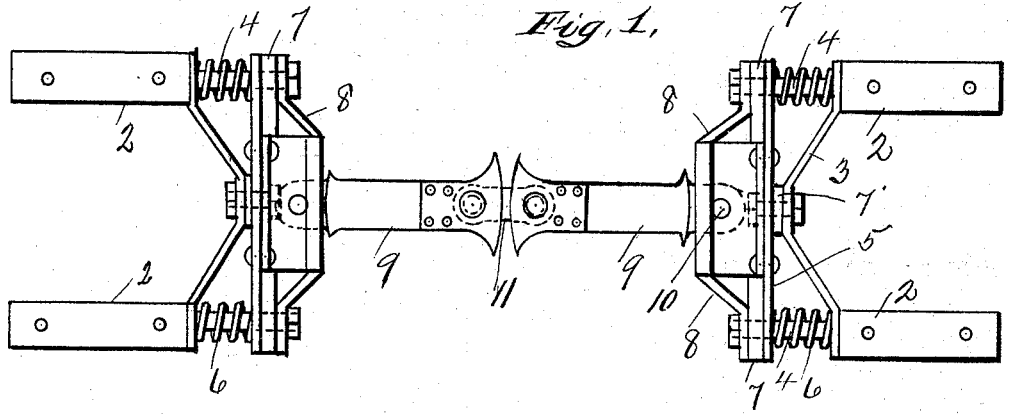
Figure 2:
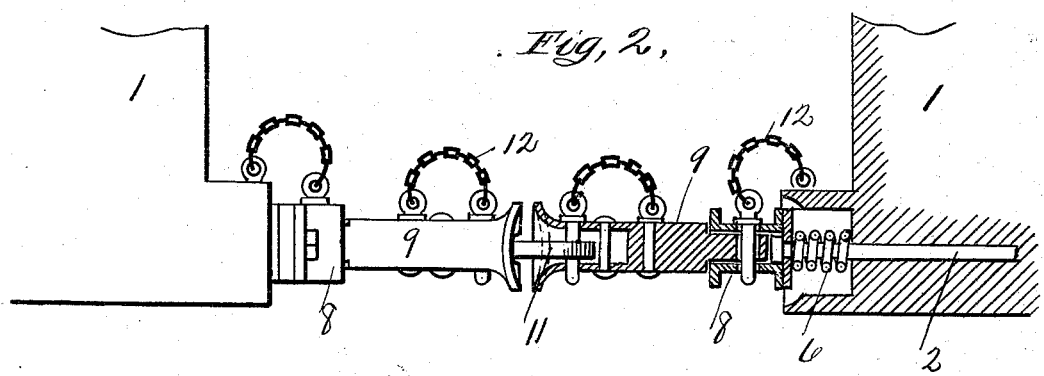

In the accompanying drawings, Figure 1 is a plan view of my improved street-car coupling which is constructed and arranged in accordance with my invention. Fig. 2 is a side elevation of the same, partly in section.

To put my invention into practice and thereby provide a car coupling particularly adapted to street railway cars using a "car fender," I provide a removable draw head consisting of a suitable iron structure 9 having a recessed portion at the front in which the ordinary link 11 and pin coupling may be used. This coupling bar 9 is provided at the rear with a means for coupling the same with a draw head 8. Each of these draw heads consists of a built up portion 8 capable of connecting by means of a pin 10, the bar 9, before described, and attached to a plate 5 having intermediate soft rubber washers 7. This plate 7 together with the draw head 8 is connected by bolts 4, to stationary plates 2, rigidly attached to the frame of the car. The springs 6 bear against a bent truss 3, which is connected to the plate 5 by a bolt having an intermediate soft rubber cushion 7'.

In operation, this construction of a car coupler for street cars will have decided advantage over those now in common use, as the draw bar 9 may be removed from one end of the car to the other, and when the car 1 is either pushing or pulling a load the springs 6 and soft rubber washers 7 will form cushions. When drawing a load the bent plate 3 will compress the springs 6 and washers 7, and when the said car is pushing the plate 5 will move back against the washers 7 and also compress the springs 6. This construction of a draw head together with its connecting plates 3—5 forms a truss and renders the coupler strong and durable.

Having thus described my invention, I claim—

A car coupling for street and other railway cars, having a removable draw bar 9, a draw head consisting of the plates 2 rigidly attached in position beneath the floor of the car, the bars 4 forming a part of the said plate the springs 6 arranged about said bars and between two plates 3—5 each of which is capable of a limited horizontal movement, the rubber washer 7 and bolt for connecting the said plates 3—5 together and the built up draw head 8 constructed as described, capable of being connected by a pin 10 to the draw bar 9, all combined for service substantially as described.

In testimony that I claim the foregoing I hereunto affix my signature this 16th day of April, A. D. 1895.

JAMES B. CAMPBELL. [L. S.]

In presence of—
ALBERT J. WALKER,
RALPH DAUB.